Feb. 26, 1929. 1,703,582
J. GELOSO
INDICATOR ELEMENT
Filed Nov. 16, 1927 2 Sheets-Sheet 1
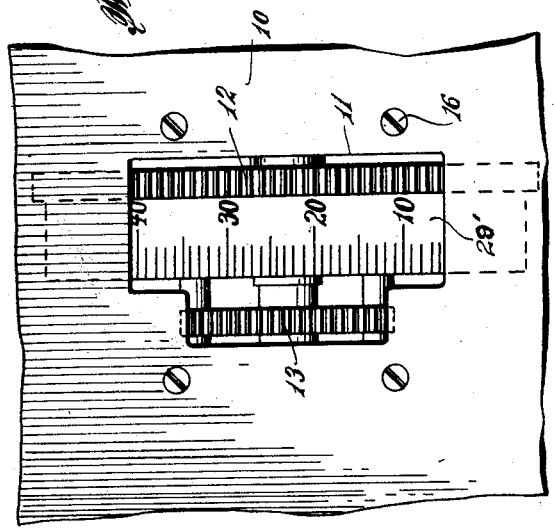
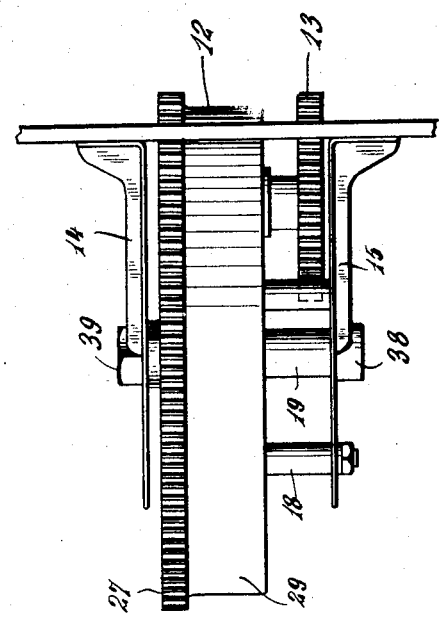
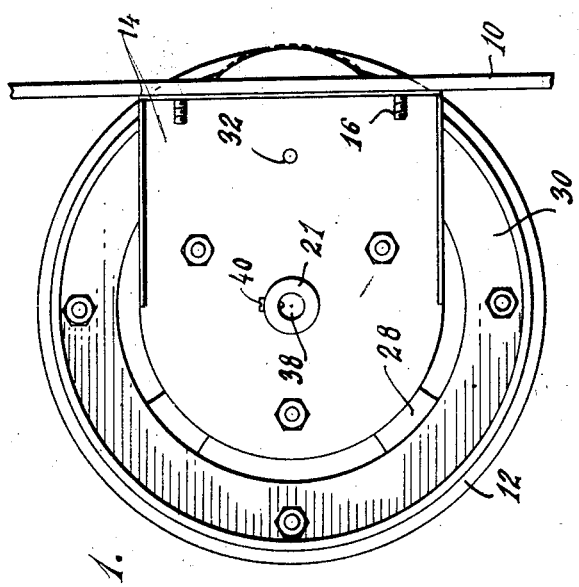

Feb. 26, 1929.　　　　　　　　　　　　　　　　1,703,582
J. GELOSO
INDICATOR ELEMENT
Filed Nov. 16, 1927　　　　2 Sheets-Sheet 2

INVENTOR
John Geloso
BY
David Truscott
ATTORNEY

Patented Feb. 26, 1929.

1,703,582

UNITED STATES PATENT OFFICE.

JOHN GELOSO, OF NEW YORK, N. Y.

INDICATOR ELEMENT.

Application filed November 16, 1927. Serial No. 233,613.

This invention relates to indicators of the visual type, being particularly directed to the so-called drum dial indicator, for application in radio receiving apparatus.

Broadly, this invention relates to a drum dial indicator comprising a rotating drum element having indicia thereon, which rotating element has associated therewith a vernier interconnected therewith, through means of a friction drive, the indicator being capable of functioning either through the rotation of the drum element itself, or through the medium of the friction drive controllable through the operation of the vernier element.

In general, this invention contemplates the production of an indicator device for radio reception apparatus wherein a drum carrying indicia for indicating the position of tuning means or other movable means, may be capable of direct displacement for producing the required movement of the tuning means and indicating the amount of said movement, and a vernier element associated therewith through frictional contact and capable, upon actuation, of actuating the drum element to produce displacement of the indicating device through smaller increments, whereby to provide for varying degrees of accuracy and precision in tuning.

Further, this invention contemplates a drum type indicator device equipped with a vernier which drum dial is capable of actuation independently or through means of a recording device, whereby to provide for varying degrees of precision in the displacement of the drum dial and the tuning means cooperating therewith.

Still further, this invention calls for introduction of a friction drive vernier as applied to a drum dial indicator whereby movement of the drum dial is controllable by frictional contact of one face of the drum with driving means actuated by the manual operation of the vernier.

These and other advantages, capabilities and features of the invention will appear from the subjoined detailed description of one specific embodiment of the invention as illustrated in the accompanying drawings in which, Fig. 1 is a side elevation of the device as applied to a panel of a radio receiver.

Fig. 2 is a front elevation of the same.

Fig. 3 is a plan view of the same.

Figure 5:
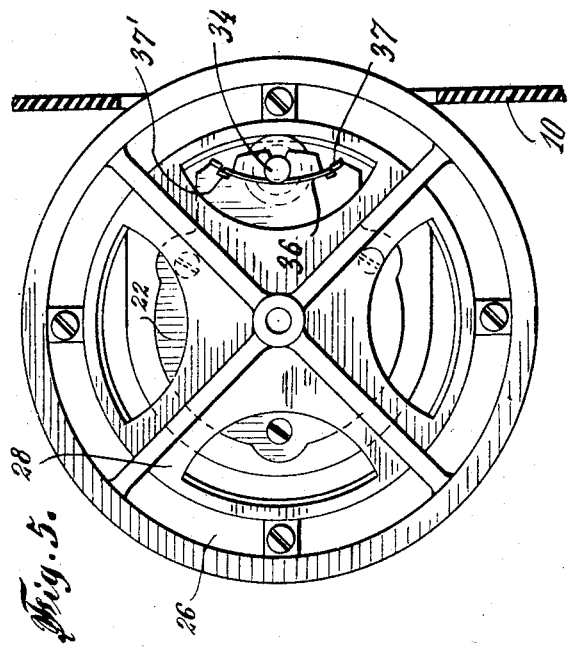
Fig. 5 is a side elevation in a different direction with the supports removed.
Figure 7:
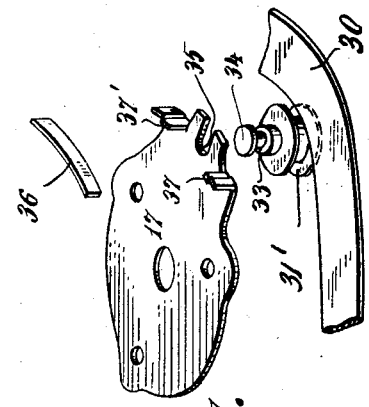
Fig. 7 is a disassembled view of some of the parts.

Referring to the reference characters in the drawing, numeral 10 represents a panel member having a cut out portion 11, shaped to allow for the passage therethrough of the drum 12 and the vernier 13 comprising the component parts of the indicator element forming the subject matter of this invention.

The drum 12 and the vernier 13 are formed of a phenolic condensation product and are carried on shafts supported by angle brackets 14 and 15, which angle brackets are fastened to the panel member by means of screws 16, whereby the drum and vernier elements may be supported for rotation in a vertical plane in order to provide for a rotative movement of the peripheries of the said drum and vernier members within the aperture 11 of the panel.

An auxiliary support bar 17, carried by a series of three pillars 18' and 18'' is provided to cooperate with the angle bracket 15 for providing a bearing for the shaft carrying the vernier member, as will be later described in detail.

A main shaft 19 is provided for carrying the drum 12, said shaft comprising a series of interlocking elements 20 and 21, which serve as a bolt and nut, since the extremity of the bolt member 20 comprises an exteriorly screw threaded portion 22 fitting into an interior screw threaded shoulder 23 of the nut member 21.

The shaft 19 is adapted to pass through apertures formed in the angle brackets 14 and 15 and in the auxiliary bracket 17 and through the aperture 24 forming the hub of the drum 12, the interlocking of the portions 22 and 23 respectively, of the bolted nut members 20 and 21, taking place within the aperture 24 of the hub.

Figure 6:
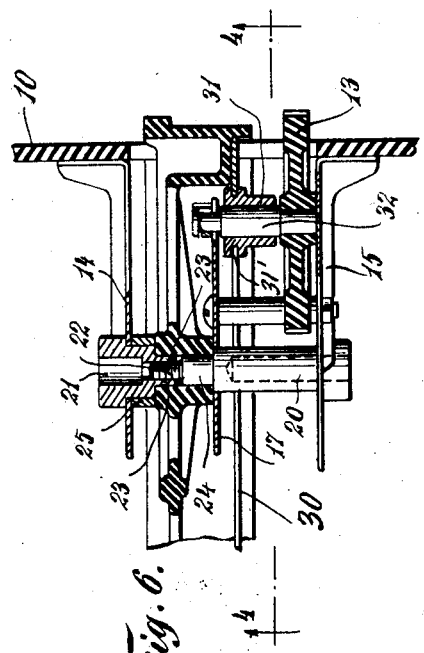
Fig. 6 is a section through lines 6—6 of Fig. 1.

A collar 25 is adapted to be positioned on a reduced portion of the bolt member 21, which collar 25 is positioned between one extremity of the hub of the drum 12 and the inner face of the angle bracket 14 as shown in Fig. 6 so that the shaft carrying the drum 12 has a three point support through the medium of the inner brackets 14 and 15 and the auxiliary bracket 17.

Figure 4:
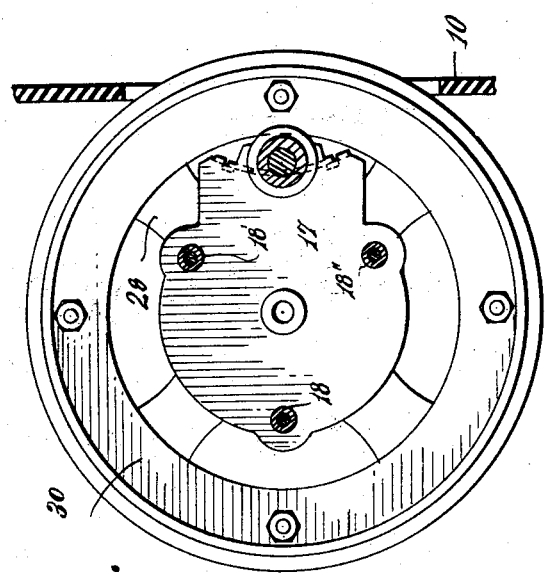
Fig. 4 is a side elevation with part of the supports removed.

Referring in detail to Figs. 3, 4 and 6, the drum member 12 comprises a moulded section of bakelite having an angular channel 26, an outer periphery 27, ribbed so that it may provide a finger hold and cross-ribs 28 for providing for a firm structural formation. The outer periphery of the drum has thereon an indicator carrying portion 29 adjacent the projecting gripping portion, upon which portion 29 there is adapted to be fastened in any well known manner, an indicia strip 29′ having a scale indicating the ranges of the results capable of being attained.

Adjacent the walls of the angular channel 26 there is positioned a metallic angular disk 30, which projects slightly inwardly along the periphery of the walls of the channel 26. This disk is adapted to contact with a friction drive comprising a collar 31 having a narrow channel 31′ therein, into which channel the projecting surfaces of the disk 30 are adapted to be in constant contact. This collar 31 is firmly fixed to the shaft 32, which shaft has also fixed thereto the vernier member 13. This shaft has a reduced portion 33 and a head 34 integral therewith, which reduced portion is adapted to be disposed within the U-shaped notch 35 formed in the auxiliary bracket 17.

As shown in Fig. 6, one extremity of the shaft 32 is maintained in an aperture of the angle bracket 16, which forms a bearing surface therefor, while the collar portion 31 fixed to the shaft 32 and pressing against the inner periphery of the disk 30 forms a second bearing therefor, the tendency of the inner periphery of this disk being to urge the shaft 32, particularly the collar portion 31 thereof, towards the center of the device.

To provide for a proper support for this shaft, the applicant has provided a flat spring member 36 freely mounted adjacent the notch 35 and having its extremities pressing against the stamped out laterally projecting portions 37 and 37′ of the auxiliary support 17, which spring 36 presses against and urges downwardly, the cut-out shaft portion 33, so that the shaft is supported in three points, to wit, angular bracket 15, auxiliary bracket 17 and the collar 31. Since the spring pressure 36 urges the shaft downwardly as against the tendency of the disk 30 to press the collar upon the shaft upwardly, the contact of the inner periphery of the disk 30 with the collar 31 at the channel portion thereof, is positive, and the movement of the collar by the rotation of the shaft through the manual application of the vernier 13 will cause the movement of the annular disk 30 within the channel of the collar 31 and as a result thereof, the movement of the drum upon which this device may be operated, either as a direct reading indicator or as a vernier. If the operator wishes to get rough direct readings, he merely rotates the drum itself by means of the finger grip 29, on the outer periphery thereof, the said drum being adapted to rotate with the central shaft 19, about the three point support, above described. The rotation of the drum 12 itself, will cause a rotation of the vernier due to the frictional contact between the disk 30 on the drum 12 and the collar 31 fixed on the shaft 32 to which the vernier is also fixed. If however, the varnier is to be applied, a rotation of the vernier about its shaft 32 is transmitted through the collar 31 frictionally to the disk 30, thence to the shaft 19 which rotates therewith.

The shaft 19, as shown in Fig. 6, is hollow and has apertures 38 and 39 therein for the passage of shafts which carry condensers or other tuning mechanisms, though this invention is not limited solely to be applied to radio reception apparatus. Set screws 40 are positioned in the head of the bolt and in the nut portions of the shaft, which set screws are adapted to contact with the said shaft of the tuning elements whereby rotation of the drum itself or through frictional coaction of the vernier will provide for the equivalent rotation of the tuning or other means through the medium of the shaft actuated upon the rotation of the drum.

It is obvious that various changes and modifications may be made to the details of construction without departing from the general spirit of the invention as set forth in the appended claims.

What I claim is:

1. An indicator device comprising a plurality of supports, adapted to be fastened to the rear of a panel, and carrying therebetween a drum, an indicia carrier positioned on said drum, a shaft passing through said drum and rotatable therewith, said shaft being adapted to carry tuning means, an auxiliary support between said first named supports, and serving with one of said supports to carry a driving element having frictional contact with said drum, whereby a rotation of said driving element actuates said drum and the shaft carrying the tuning means.

2. An indicator dial comprising a drum carried by and rotatable within a plurality of supports, an auxiliary support fixed to one of said supports, an operating element carried by and rotatable between the auxiliary support and the above named support, indicia carried on said drum and means associated with said operating element for frictionally contacting with the drum, whereby movement of said operating element actuates said drum.

3. A vernier dial comprising a plurality of support members having a shaft journalled therein, a drum carried by said shaft, indicia on said drum, said shaft being hollowed whereby tuning means may be fastened thereto, an auxiliary support and means carried between the auxiliary support and one of said first named support members for rotating said drum.

4. An indicating element for radio instruments comprising support members having a shaft journalled for rotation therein, a drum carrying indicia fixed to said shaft, said shaft being adapted to have tuning means attachable thereto, an auxiliary support between said first named supports and adapted with one of said supports, to carry a second shaft for rotation, a control on said shaft and means on said shaft for frictionally contacting with the inner periphery of said drum, whereby rotation of said control will actuate said drum and said shaft, having tuning means associated therewith.

5. An indicating instrument for electrical circuits comprising a drum element supported upon a shaft rotatable between parallel supports, tuning means associated with and rotated by said shaft, an auxiliary support cooperating with one of said first named supports for carrying a second shaft, a control element mounted on said second shaft and means on said second shaft for frictionally contacting with the drum element whereby actuation of said control element causes displacement of said drum shaft and said tuning means.

6. An indicator dial for electrical instruments comprising a hollow shaft for carrying tuning means journalled in a plurality of supports, an indicia carrying drum fixed to said shaft for rotation therewith, an auxiliary support fixed to one of said support members and between which a second shaft is adapted to rotate a control element on said second shaft and means on said second shaft contacting with said drum whereby actuation of said control element causes displacement of said drum and the tuning means associated therewith.

7. An indicating instrument for electrical circuits comprising a drum, a plurality of supports between which there is carried a hollow shaft adapted to carry said drum on its exterior and tuning means on the interior thereof, indicia carried on said drum, an auxiliary support between said first named supports, and fixed to one of said first named supports, and between which auxiliary support and the above named support there is carried means for frictionally contacting with the periphery of said drum, whereby the tuning means may be displaced in proportion to the displacement of said drum.

8. An indicator element comprising a drum carried on a shaft rotating between support bars, said shaft being hollow and being adapted to carry tuning means therein, an auxiliary support between said support bars, and a shaft carried between one of said support bars and the auxiliary support, a control element on said shaft, means on said last named shaft for contacting with and actuating the drum, indicia carried on said drum, the movement of said drum causing a displacement of the first named shaft, and the tuning means carried thereby.

JOHN GELOSO.